J. M. HALL.
Cotton Cultivator.
No. 22,647. Patented Jan'y 18, 1859.
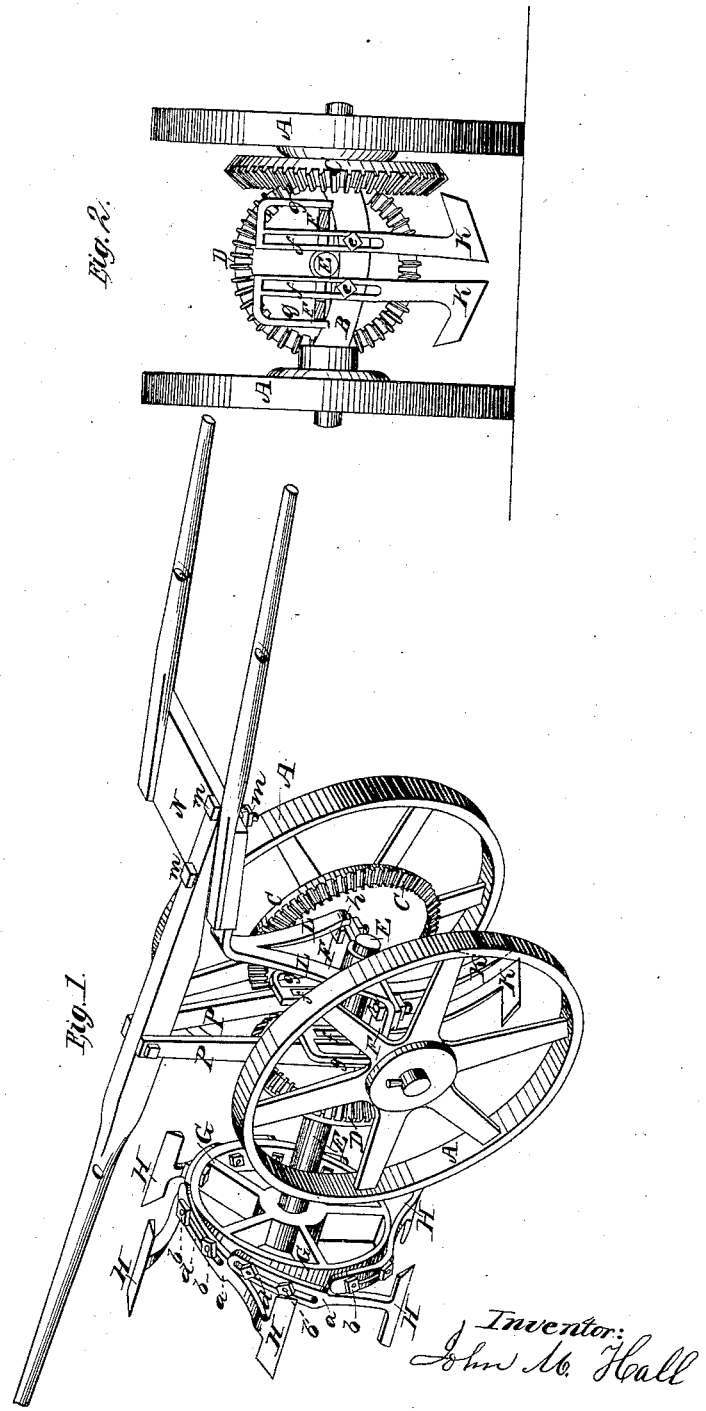

UNITED STATES PATENT OFFICE.

JNO. M. HALL, OF WARRENTON, GEORGIA.

IMPROVEMENT IN COTTON-CULTIVATORS.

Specification forming part of Letters Patent No. 22,647, dated January 18, 1859.

*To all whom it may concern:*

Be it known that I, JOHN M. HALL, of Warrenton, in the county of Warren and State of Georgia, have invented certain new and useful Improvements in Rotary Hoe-Machines for Dressing and Chopping Out Cotton; and I do hereby declare that the following is a full, clear, and exact description of the construction and operation of the same, reference being had to the accompanying drawings, in which—

Figure 1 represents a perspective view of said machine. Fig. 2 represents an end view of the same.

My invention relates to an improvement on a rotary hoe-machine for which Letters Patent were granted to me on the 21st day of April, 1857; and it consists in providing said hoe in front with two scraping-shares, which are intended to dress the rows of cotton preparatory to its being chopped out by the hoes of revolving hoe-wheel.

To enable others skilled in the art to make and use my improvement, I will proceed to describe it construction and operation.

A represents the two driving-wheels which support the machine. They both turn loosely on the axle B, the shape of which is represented in Fig. 2.

C is a bevel-wheel, which is secured to one of the wheels A, and which is in gear with the bevel-wheel D on shaft E.

F represents an iron frame, which is secured to the axle B, and which supports the shaft E in its bearings.

G represents a wheel which is secured to the shaft E, and to the circumference of which are secured the hoes H. The shanks *a* of said hoes are curved in the shape of the circumference of the wheel G, and are secured to the rim of the wheel by means of the screw-bolts *b*, which pass through the slots *d*. By this arrangement the lengths of the hoes H can be adjusted to adapt them to rows of different width.

K represents two scraping-plows, which are secured in front of the axle B. The shanks of said scrapers are slotted, and the screw-bolts *e*, by means of which they are secured to the axle B, pass through said slots *f*, and by this arrangement the height of the scrapers K can be adjusted. The upper parts of the shanks of the scrapers are formed with bent arms *g*, which extend downward and around the two sides of the frame F, which is shown in section in Fig. 2. The object of these arms *g* is to keep the shanks of the scrapers perpendicular while being adjusted.

L represents a standard, which is secured to the frame F by means of the bolts *h*. The standard L is bent at its upper part to nearly a right angle, and a short cross-brace, N, is secured to it by means of the screw-bolts *m*. These screw-bolts at the same time pass through the thick end of the lever O, and thus secure that end of the lever O to the plank N. The lever O is supported besides by means of two standards, P, which at their lower ends are secured to the frame F. By means of this lever the machine can be guided, and the hoe-wheel G can be raised or lowered at pleasure.

Q represents the two shafts to which the horse is hitched, and which are secured in any proper manner to the cross-brace N.

The operation of this machine is as follows: As the machine is drawn along the scrapers K cut off the excess of plants in the land, leaving only a row between them, and the driving-wheels A impart a rotary motion to the bevel-wheel C, which, meshing into the wheel D, causes the shaft E and the hoe-wheel G to revolve. The hoes H chop out the cotton in a transverse direction, and thus leave what remains in hills. The hoes have another adjustment beside that above mentioned—viz., in a line oblique or spiral to the perimeter of the wheel—so that the lengths or distances between their cuts across the furrow or row may be regulated at the pleasure of the user.

Having thus fully described the nature and object of my invention, what I claim therein as new, and desire to secure by Letters Patent, is—

In combination with the series of adjustable revolving hoes, the scrapers K K in advance of them, substantially in the manner and for the purpose described.

JOHN M. HALL.

Witnesses:
THOS. H. UPPERMAN,
E. COHEN.